US009811095B2

(12) United States Patent
Ramirez Flores et al.

(10) Patent No.: US 9,811,095 B2
(45) Date of Patent: Nov. 7, 2017

(54) GLASSES WITH FLUID-FILLABLE MEMBRANE FOR ADJUSTING FOCAL LENGTH OF ONE OR MORE LENSES OF THE GLASSES

(71) Applicant: Lenovo (Singapore) Pte. Ltd., New Tech Park (SG)

(72) Inventors: Axel Ramirez Flores, Cary, NC (US); Rod David Waltermann, Rougemont, NC (US); James Anthony Hunt, Chapel Hill, NC (US); Bruce Douglas Gress, Raleigh, NC (US); James Alan LaCroix, Zebulon, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 624 days.

(21) Appl. No.: 14/453,024

(22) Filed: Aug. 6, 2014

(65) Prior Publication Data
US 2016/0041406 A1 Feb. 11, 2016

(51) Int. Cl.
*G09G 5/00* (2006.01)
*G02C 3/00* (2006.01)
(Continued)

(52) U.S. Cl.
CPC ............. *G05D 7/0617* (2013.01); *G02B 3/14* (2013.01); *G02B 26/004* (2013.01); *G02B 26/0825* (2013.01); *G02B 27/0093* (2013.01); *G02B 27/017* (2013.01); *G02C 7/08* (2013.01); *G02C 7/085* (2013.01); *G02C 7/086* (2013.01); *G02C 7/088* (2013.01); *G05B 15/02* (2013.01); *G06F 3/013* (2013.01); *G02B 2027/014* (2013.01);
(Continued)

(58) Field of Classification Search
CPC .............. G02B 26/004; G02B 26/0825; G02B 27/0093; G02B 27/017; G02B 2027/014; G02B 2027/0187; G02B 3/12; G02B 3/14; G02C 7/08; G02C 7/085; G02C 7/086; G02C 7/088; G02F 2001/294; G06F 3/013
USPC ................ 345/8; 351/159.1–159.14, 159.68; 359/630, 665, 666
See application file for complete search history.

(56) References Cited

U.S. PATENT DOCUMENTS

| 2,510,344 A | 6/1950 | Law |
| 2,567,654 A | 9/1951 | Siezen |

(Continued)

FOREIGN PATENT DOCUMENTS

| DE | 10310794 | 9/2004 |
| DE | 69937592 | 10/2008 |

(Continued)

OTHER PUBLICATIONS

Superfocus—Keep Your World in Focus. Retrieved from http://superfocus.com/ (6 pages).

(Continued)

*Primary Examiner* — George C Neurauter
(74) *Attorney, Agent, or Firm* — John L. Rogitz; John M. Rogitz (57) ABSTRACT

In one aspect, a device includes a frame, at least one lens coupled to the frame, at least one membrane at least partially covering at least one face of the lens, a reservoir in fluid communication with the membrane and containing fluid, and a fluid control assembly which controls fluid communication of the fluid between the reservoir and the membrane.

20 Claims, 8 Drawing Sheets

(51) Int. Cl.
| | |
|---|---|
| G02C 7/00 | (2006.01) |
| G02C 7/02 | (2006.01) |
| G02B 27/14 | (2006.01) |
| G02B 1/06 | (2006.01) |
| G02B 3/12 | (2006.01) |
| G05D 7/06 | (2006.01) |
| G05B 15/02 | (2006.01) |
| G02B 26/00 | (2006.01) |
| G02C 7/08 | (2006.01) |
| G02B 27/01 | (2006.01) |
| G06F 3/01 | (2006.01) |
| G02B 3/14 | (2006.01) |
| G02B 26/08 | (2006.01) |
| G02B 27/00 | (2006.01) |
| G02F 1/29 | (2006.01) |

(52) U.S. Cl.
CPC .............. *G02B 2027/0187* (2013.01); *G02F 2001/294* (2013.01)

(56) References Cited

U.S. PATENT DOCUMENTS

| | | | | |
|---|---|---|---|---|
| 2,836,101 | A * | 5/1958 | De Swart | G02B 3/14 359/666 |
| 3,418,426 | A | 12/1968 | Schlegel et al. | |
| 3,598,479 | A * | 8/1971 | Wright | G02C 7/085 351/159.04 |
| 3,628,854 | A | 12/1971 | Jampolsky | |
| 4,082,433 | A | 4/1978 | Appeldorn et al. | |
| 4,190,330 | A | 2/1980 | Berreman | |
| 4,577,928 | A | 3/1986 | Brown | |
| 5,182,585 | A * | 1/1993 | Stoner | G02B 3/14 351/158 |
| 5,579,037 | A | 11/1996 | Tahara et al. | |
| 5,583,702 | A | 12/1996 | Cintra | |
| 5,684,637 | A * | 11/1997 | Floyd | G02C 7/085 359/666 |
| 6,046,847 | A | 4/2000 | Takahashi | |
| 6,417,894 | B1 | 7/2002 | Goff et al. | |
| 6,618,208 | B1 * | 9/2003 | Silver | G02B 3/14 359/665 |
| 7,245,440 | B2 * | 7/2007 | Peseux | G02B 26/005 359/665 |
| 7,826,145 | B2 * | 11/2010 | Justis | G02B 3/14 359/665 |
| 7,940,467 | B2 * | 5/2011 | Berge | G02B 3/14 359/665 |
| 8,814,691 | B2 * | 8/2014 | Haddick | G02B 27/017 463/30 |
| 8,884,984 | B2 * | 11/2014 | Flaks | G02B 27/017 345/419 |
| 8,941,559 | B2 * | 1/2015 | Bar-Zeev | G02B 26/026 345/204 |
| 9,042,027 | B2 * | 5/2015 | Egan | G02B 3/14 359/666 |
| 9,158,130 | B2 * | 10/2015 | Wehrenberg | G02C 7/085 |
| 9,292,973 | B2 * | 3/2016 | Bar-Zeev | G02B 27/017 |
| 9,366,862 | B2 * | 6/2016 | Haddick | G02B 27/0093 |
| 9,442,285 | B2 * | 9/2016 | Rogers | G02B 3/14 |
| 9,535,264 | B2 * | 1/2017 | Gupta | G02C 7/085 |
| 2003/0095336 | A1 * | 5/2003 | Floyd | G02B 3/14 359/665 |
| 2004/0160419 | A1 | 8/2004 | Padgitt | |
| 2007/0201138 | A1 * | 8/2007 | Lo | G02B 3/14 359/666 |
| 2009/0021823 | A1 * | 1/2009 | Heim | G02B 3/14 359/290 |
| 2009/0065578 | A1 | 3/2009 | Peterson et al. | |
| 2009/0204410 | A1 | 8/2009 | Mozer et al. | |
| 2009/0259349 | A1 | 10/2009 | Golenski | |
| 2009/0295683 | A1 * | 12/2009 | Pugh | G02B 27/0101 345/9 |
| 2009/0315740 | A1 | 12/2009 | Hildreth et al. | |
| 2010/0079508 | A1 | 4/2010 | Hodge et al. | |
| 2010/0171720 | A1 | 7/2010 | Craig et al. | |
| 2010/0208194 | A1 * | 8/2010 | Gupta | G02B 3/14 351/159.68 |
| 2010/0208195 | A1 * | 8/2010 | Gupta | G02C 7/085 351/159.68 |
| 2010/0208357 | A1 * | 8/2010 | Batchko | G02B 3/14 359/666 |
| 2010/0211918 | A1 | 8/2010 | Liang et al. | |
| 2011/0065451 | A1 | 3/2011 | Danado et al. | |
| 2012/0149309 | A1 | 6/2012 | Hubner et al. | |
| 2012/0220311 | A1 | 8/2012 | Rodriguez et al. | |
| 2012/0268268 | A1 | 10/2012 | Bargero | |
| 2013/0021459 | A1 | 1/2013 | Vasilieff et al. | |
| 2013/0044042 | A1 | 2/2013 | Olsson et al. | |
| 2013/0128368 | A1 * | 5/2013 | Costache | G02B 26/004 359/666 |
| 2013/0170755 | A1 | 7/2013 | Dalton et al. | |
| 2013/0246663 | A1 | 9/2013 | Raveendran et al. | |
| 2013/0307771 | A1 | 11/2013 | Parker et al. | |
| 2014/0317524 | A1 | 10/2014 | VanBlon et al. | |
| 2015/0028195 | A1 * | 1/2015 | King | B29D 11/00461 250/216 |
| 2015/0234206 | A1 * | 8/2015 | Lee | G02C 7/085 351/206 |
| 2015/0253858 | A1 * | 9/2015 | Koukoumidis | G06F 3/0488 345/156 |
| 2016/0004102 | A1 * | 1/2016 | Nisper | G02B 3/14 351/158 |

FOREIGN PATENT DOCUMENTS

| | | |
|---|---|---|
| EP | 0880090 | 11/1998 |
| WO | 2004051392 | 6/2004 |

OTHER PUBLICATIONS

Darren Quick, "PixelOptics to launch 'world's first electronic focusing eyewear'" Jan. 12, 2011, http://www.gizmag.com/pixeloptics-empower-electronic-focusing-glasses/17569/ (6 pages).

"Electronic-lens company PixelOptics is bankrupt", Dec. 12, 2013, http://insightnews.com.au/-blog/NEWS_NOWI/post/electronics-lens-company-pixeloptics-is-bankrupt/ (3 Pages).

Arnold S. Weksler, John Carl Mese, Rod D. Waltermann, Russell Speight Vanblon, Nathan J. Peterson, "Adjustable Display Optics", related U.S. Appl. No. 14/100,593, Non-Final Office Action dated Jan. 5, 2016.

Arnold S. Weksler, John Carl Mese, Rod D. Waltermann, Russell Speight Vanblon, Nathan J. Peterson, "Adjustable Display Optics", related U.S. Appl. No. 14/100,593, Applicant's response to Non-Final Office Action, filed May 5, 2016.

Arnold S. Weksler, John Carl Mese, Rod D. Waltermann, Russell Speight Vanblon, Nathan J. Peterson, "Adjustable Display Optics", related U.S. Appl. No. 14/100,593, Final Office Action dated Aug. 29, 2016.

Russell Speight Vanblon, Neal Robert Caliendo Jr.; "Automatic Magnification and Selection Confirmation" file history of related U.S. Appl. No. 14/322,119, filed Jul. 2, 2014.

Russell Speight Vanblon, Neal Robert Caliendo Jr.; "Magnification Based on Eye Input" file history of related U.S. Appl. No. 14/546,962, filed Nov. 18, 2014.

Russell Speight Vanblon, Suzanne Marion Beaumont, Rod David Waltermann, "Detecting Pause in Audible Input to Device" file history of related U.S. Appl. No. 14/095,369, filed Dec. 3, 2013.

Suzanne Marion Beaumont, Russell Speight Vanblon, Rod D. Waltermann, "Devices and Methods to Receive Input at a First Device and Present Output in Response on a Second Device Different from the First Device" file history of related U.S. Appl. No. 14/095,093, filed Dec. 3, 2013.

Jonathan Gaither Knox, Rod D. Waltermann, Liang Chen, Mark Evan Cohen, "Initiating Personal Assistant Application Based on Eye Tracking and Gestures" file history of related U.S. Appl. No. 14/095,235, filed Dec. 3, 2013.

(56) References Cited

OTHER PUBLICATIONS

Nathan J. Peterson, John Carl Mese, Russell Speight Vanblon, Arnold S. Weksler, Rod D. Waltermann, Xin Feng, Howard J. Locker, "Systems and Methods to Present Information on Device Based on Eye Tracking" file history of related U.S. Appl. No. 14/132,663, filed Dec. 18, 2013.

Russell Speight Vanblon, Rod David Waltermann, John Carl Mese, Arnold S. Weksler, Nathan J. Peterson, "Detecting Noise or Object Interruption in Audio Video Viewing and Altering Presentation Based Thereon" file history of related U.S. Appl. No. 14/158,990, filed Jan. 20, 2014.

Russell Speight Vanblon, Axel Ramirez Flores, Jennifer Greenwood Zawacki, Alan Ladd Painter, "Skin Mounted Input Device" file history of related U.S. Appl. No. 14/1162,115, filed Jan. 23, 2014.

Steven Richard Perrin, Jianbang Zhang, John Weldon, Scott Edwards Kelso, "Initiating Application and Performing Function Based on Input" file history of related U.S. Appl. No. 14/557,628, filed Dec. 2, 2014.

Rod David Waltermann, John Carl Mese, Nathan J. Peterson, Arnold S. Weksler, Russell Speight Vanblon, "Movement of Displayed Element from One Display to Another" file history of related U.S. Appl. No. 14/550,107, filed Nov. 21, 2014.

Amy Leigh Rose, Nathan J. Peterson, John Scott Crowe, Bryan Loyd Young, Jennifer Lee-Baron, "Presentation of Data on an at Least Partially Transparent Display Based on User Focus" file history of related U.S. Appl. No. 14/548,938, filed Nov. 20, 2014.

Wikipedia, "Electromyography", definition; http://en.wikipedia.org/wiki/Electromyogrpahy, printed from website Jan. 27, 2015.

Isource: "Raise to Speak Makes Siri Wonderfully Useful (Once You Know How to Use It)", http:///isource.com/10/01/raise-to-speak-makes-siri-wonderfully-useful-once-you-know-how-to-use-it./ Web printout Nov. 15, 2013.

Wikipedia, "Microphone array", definition, http://en.wikipedia.org/wiki/Microphone_array, printed from website Jan. 22, 2015.

Wikipedia, "Microphone", definition; http://en.wilipedia.org/wkik/microphone, printed from website Jan. 22, 2015.

Thalmiclabs, "Myo Gesture Control Armband" http://www.thalmic.com/en/myo, printed from website Jan. 27, 2015.

Thalmiclabs, "Myo-Tech Specs", http://www.thalmic.com/en/myo/techspecs, printed from website Jan. 27, 2015.

Wikipedia, "Beamforning", definition; http://en.wikipedia.org/wiki/Beamforming, printed from website Jan. 22, 2015.

Wikipedia, "Extended Display Identification Data", Definition; http://en.wikipedia.org/wiki/Extended_display_Identification_data, printed from website Oct. 10, 2014.

Extron , "Digital Connection, Understanding EDID—Extended Display Identification Data", Fall 2009, www.extron.com.

"Relationship Between Inches, Picas, Points, Pitch, and Twips", Article ID: 76388; http://support2.microsoft.com/KB/76388. Printed Oct. 10, 2014.

Wikipedia, "Polarizer" Definition; http://en.wikipedia.org/wiki/Polarizer, printed from website Jan. 14, 2015.

Wikepedia, "Smart Glass" Definition, http://en.wikipedia.org/wiki/Smart_glass, printed from website Jan. 14, 2015.

"Understanding & Using Directional Microphones", http://www.soundonsound.com/sos/sep00/articles/direction.htm; Published in SOS Sep. 2000.

Tactus Technology, "Taking Touch Screen Interfaces Into A New Dimension", 2012 (13 pages).

Arthur Davis, Frank Kuhnlenz, "Optical Design Using Fresnel Lenses, Basic Principles and some Practical Examples" Optik & Photonik, Dec. 2007, No. 4, pp. 52-55.

Xin Feng, Mei-Wen Sun, James Anthony Hunt, "Presenting User Interface on a First Device Based on Detection of a Second Device Within a Proximity to the First", related pending U.S. Appl. No. 14/294,792, filed Jun. 3, 2014.

* cited by examiner

GLASSES WITH FLUID-FILLABLE MEMBRANE FOR ADJUSTING FOCAL LENGTH OF ONE OR MORE LENSES OF THE GLASSES

FIELD

The present application relates generally to systems and methods for controlling glasses with one or more fluid-fillable membranes for adjusting a focal length of at least a portion of one or more lenses of the glasses.

BACKGROUND

Currently, most glasses that are produced have lenses with fixed focal lengths, which is problematic for individuals whose eyesight may be changing and/or for those wishing to view things at different distances. Even if some of these glasses can be repositioned to change focus (e.g. based on which portion of a bifocal lens is being looked through), such manipulation is to be done manually by a user. This can be cumbersome, inadequate, and imprecise, to say the least.

SUMMARY

Accordingly, in one aspect eye glasses include a frame, at least one lens coupled to the frame, at least one membrane at least partially covering at least one face of the lens, a reservoir in fluid communication with the membrane and containing fluid, and a fluid control assembly which controls fluid communication of the fluid between the reservoir and the membrane.

In another aspect, a method includes determining a distance from a device to an object, where the device includes at least one lens, at least one membrane at least partially covering at least one face of the lens at a first area, and a reservoir in fluid communication with the membrane. The method also includes controlling the at least one membrane to at least partially fill with fluid from the reservoir to configure the first area to have a focal length corresponding to the distance.

In still another aspect, a device includes a frame, at least one lens coupled to the frame, at least one compartment at least partially covering at least one face of the lens, a reservoir in fluid communication with the compartment and containing fluid, a processor, and a memory accessible to the processor. The memory bears instructions executable by the processor to control the device to manage fluid transfer between the reservoir and the compartment based on at least one of input from a person and a determination at least in part using the processor of distance to an object.

The details of present principles, both as to their structure and operation, can best be understood in reference to the accompanying drawings, in which like reference numerals refer to like parts, and in which:

DETAILED DESCRIPTION

This disclosure relates generally to device-based information. With respect to any computer systems discussed herein, a system may include server and client components, connected over a network such that data may be exchanged between the client and server components. The client components may include one or more computing devices including televisions (e.g. smart TVs, Internet-enabled TVs), computers such as desktops, laptops and tablet computers, so-called convertible devices (e.g. having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by e.g. a module can be redistributed to other software modules and/or combined together in a single module and or made available in a shareable library.

Logic when implemented in software, can be written in an appropriate language such as but not limited to C# or C++, and can be stored on or transmitted through a computer-readable storage medium (e.g. that may not be a carrier wave) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 1:
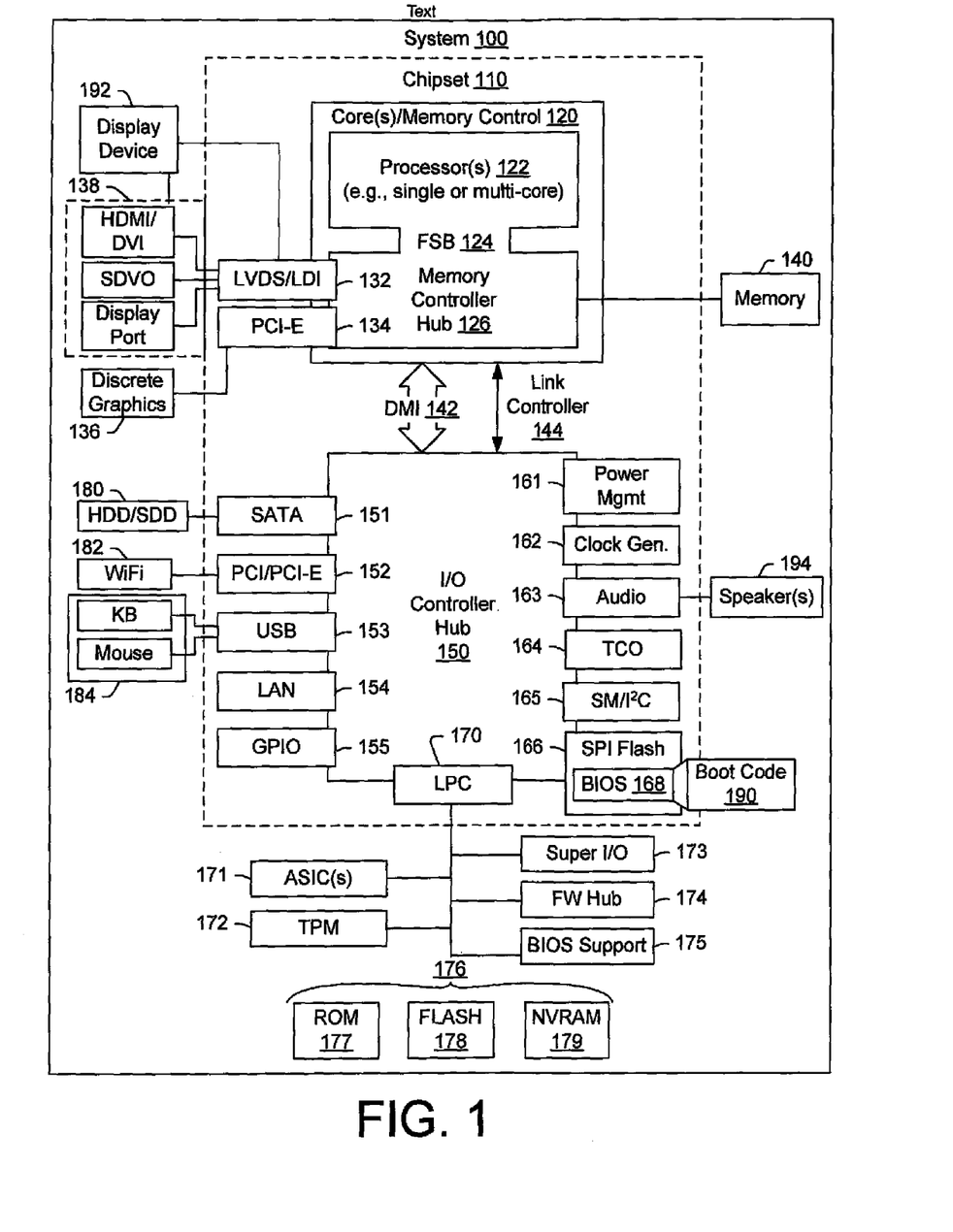
FIG. 1 is a block diagram of an example system in accordance with present principles.

Now specifically in reference to FIG. 1, it shows an example block diagram of an information handling system and/or computer system 100. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be e.g. a game console such as XBOX® or Playstation®.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 further includes a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including e.g. one of more GPUs). An example system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be e.g. tangible computer readable storage mediums that may not be carrier waves. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though now shown for clarity, in some embodiments the system 100 may include a gyroscope for e.g. sensing and/or measuring the orientation of the system 100 and providing input related thereto to the processor 122, an accelerometer for e.g. sensing acceleration and/or movement of the system 100 and providing input related thereto to the processor 122, an audio receiver/microphone providing input to the processor 122 e.g. based on a user providing audible input to the microphone, and a camera for gathering one or more images and providing input related thereto to the processor 122. The camera may be, e.g., a thermal imaging camera, a digital camera such as a webcam, and/or a camera integrated into the system 100 and controllable by the processor 122 to gather pictures/images and/or video. Still further, and also not shown for clarity, the system 100 may include a GPS transceiver that is configured to e.g. receive geographic position information from at least one satellite and provide the information to the processor 122. However, it is to be understood that another suitable position receiver other than a GPS receiver may be used in accordance with present principles to e.g. determine the location of the system 100.

Figure 2:
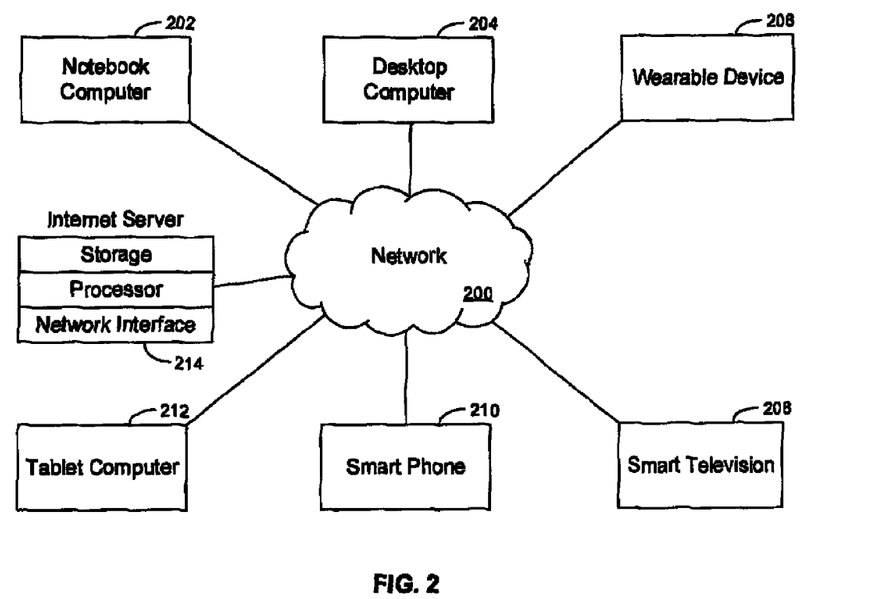
FIG. 2 is a block diagram of a network of devices in accordance with present principles.

Before moving on to FIG. 2, it is to be understood that an example client device or other machine/computer may include fewer or more features than shown on the system 100 of FIG. 1. In any case, it is to be understood at least based on the foregoing that the system 100 is configured to undertake present principles.

Turning now to FIG. 2, it shows example devices communicating over a network 200 such as e.g. the Internet in accordance with present principles. It is to be understood that e.g. each of the devices described in reference to FIG. 2 may include at least some of the features, components, and/or elements of the system 100 described above. In any case, FIG. 2 shows a notebook computer 202, a desktop computer 204, a wearable device 206 such as e.g. a smart watch, a smart television (TV) 208, a smart phone 210, a tablet computer 212, and a server 214 in accordance with present principles such as e.g. an Internet server that may e.g. provide cloud storage accessible to the devices 202-212. It is to be understood that the devices 202-214 are configured to communicate with each other over the network 200 to undertake present principles.

Figure 3:
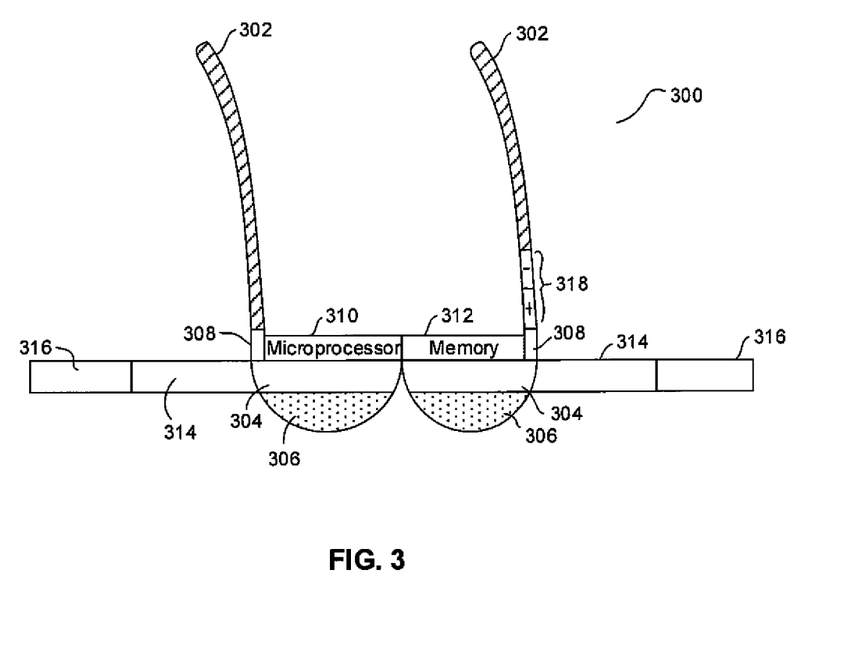
FIG. 3 is a perspective view of example eye glasses in accordance with present principles.

Referring to FIG. 3, it shows a perspective view of example eye glasses 300 in accordance with present principles, it being understood that the system 100 may be e.g. embodied in the glasses 300 and accordingly the glasses 300 may include some or all of the elements of the system 100 discussed above. In any case, the glasses 300 include a frame 302 which may comprise elongated arms for positioning over the ears of a person, as well as a center portion between the elongated arms at respective first ends of the arms to connect the arms, and/or engage with and/or couple to one or more lenses and other components of the glasses 300 to be described shortly. However, first note that one or more portions of the frame 302, such as e.g. one or both elongated arms, may comprise one or more fluid reservoirs in accordance with present principles. E.g., one of the arms may be at least partially hollow and configured for holding fluid (e.g. the fluid being represented by the pattern shown on the arms of the frame 302), which may be e.g. optically clear fluid.

The glasses 300 also include one or more lenses 304 respectively bearing at least one membrane or compartment 306 for holding and/or at least partially filling with fluid provided from the reservoir(s) in the frame 302 by a fluid control assembly 308. The membrane(s) 306 may be arranged on a face of each lens, such as e.g. on the front exterior face of the lens relative to the glasses being worn right-side up, or on the back exterior face of the lens relative to the glasses being worn right-side up. Thus, e.g. the face on which the membrane(s) 306 are arranged may be a surface at least substantial orthogonal to the principal axis of the respective lens. Furthermore, note that lenses 304 in some embodiments may be e.g. plano-convex, biconvex, positive meniscus, negative meniscus, plana-concave, or biconcave.

Describing the fluid control assembly 308 referenced above in more detail, it may comprise a pump (e.g. a piezoelectric pump, a digital pump, etc.) for pumping fluid from the reservoir(s) to the membrane(s) 306, and may also include a valve for selectively allowing and blocking fluid flow from the reservoir to the membrane e.g. via the pump. In some embodiments, the reservoir may be fluidly connected to the pump, with the pump fluidly connected to the valve, and the valve fluidly connected to at least one lumen for providing fluid to the membrane(s) 306, it also being understood that the valve may be fluidly connected to the membrane(s) 306 itself.

Describing the fluid and membrane(s) 306 in more detail, it is to be understood that the fluid and/or membrane(s) 306 may have the same or at least substantially the same index of refraction as the lens(es) 304. The membrane(s) 306 may be flexible and/or arranged on the lens(es) 304 to be at least substantially flush therewith so as to e.g. give a unitary appearance to a person, and furthermore may be made of e.g. a synthetic material comprising organic and/or inorganic materials. E.g. material of the membrane(s) 306 may a polymer. The fluid may comprise e.g. oil, saline, or another suitable gas or liquid with the same or at least substantially the same index of refraction as the lens(es) 304 and/or membrane(s) 306.

Still in reference to FIG. 3, the glasses 300 may also include a processor 310 and memory 312 accessible to the processor 310 and storing data such as e.g. instructions executable by the processor 310 to undertake present principles (e.g. instructions storing the logic discussed in reference to FIG. 4 below). It is to be understood that in some embodiments, the fluid control assembly 308 may comprise the processor 310 and memory 312.

As also shown in FIG. 3, the glasses 300 may comprise one or more cameras 314 such as e.g. digital cameras and/or cameras configured for gathering infrared (IR) light (e.g. a specialized IR camera, a camera with IR response, etc.). The glasses 300 may also include one or more distance sensors 316 such as e.g. laser-based distance sensors and/or sonar-based distance sensors for determining a distance to an object in the field of view of the sensors 316. However, it is to also be understood that the cameras 314 may be used to determine distance as well based on object identification and/or distance determination principles and/or software.

In any case, the distance sensors 316 may comprise e.g. so-called "time-of-flight" lasers used to determine distance data pertaining to the distance from the glasses 300 to one or more objects based on e.g. light emitted from the lasers such as e.g. light visible to the human eye and/or (e.g. relatively low power) infrared (IR) light. The lasers may be e.g. vertical cavity surface emitting lasers. But regardless, it is to be understood that the lasers of the distance sensors 316 may e.g. emit laser pulses in sequence to respectively determine distance data for different portions of one or more objects in the field of view of the glasses 300 (and/or field of view of the sensors 316) based on the "time of flight" of reflection of pulses emitted from respective lasers as sensed e.g. by the camera 314 gathering (e.g. IR) light from the reflection of the laser off an object, and/or as sensed by another portion of the sensor 316 for gathering the light (e.g. a light sensor). Thus, in one respect, determining the distance from the glasses 300 to an object may be based on the time taken for light from the first laser to travel to the object, be reflected off the object, and travel back to the glasses 300. Accordingly, the distance may be determined based on e.g. the sensor 316 and/or the processor 310 performing the equation e.g. distance=(speed of light×time)/2. Put another way, the equation may be distance equals speed of light multiplied by the time for the pulse to be emitted and reflected back to the glasses 300, where that product is then divided by two.

It is to be understood that in addition to the foregoing, one or more of the cameras 314 on the glasses 300 may be oriented to track eye movement of a user wearing the glasses. Thus, using eye tracking principles and/or software, the processor 310 may determine which direction and/or to which objects the user is looking, and thus determine e.g. which membrane to at least partially fill with fluid to focus on the object at a distance determined by the glasses 300 based on the line of sight of the user through at least one of the lenses 304 to the object.

Figure 4:
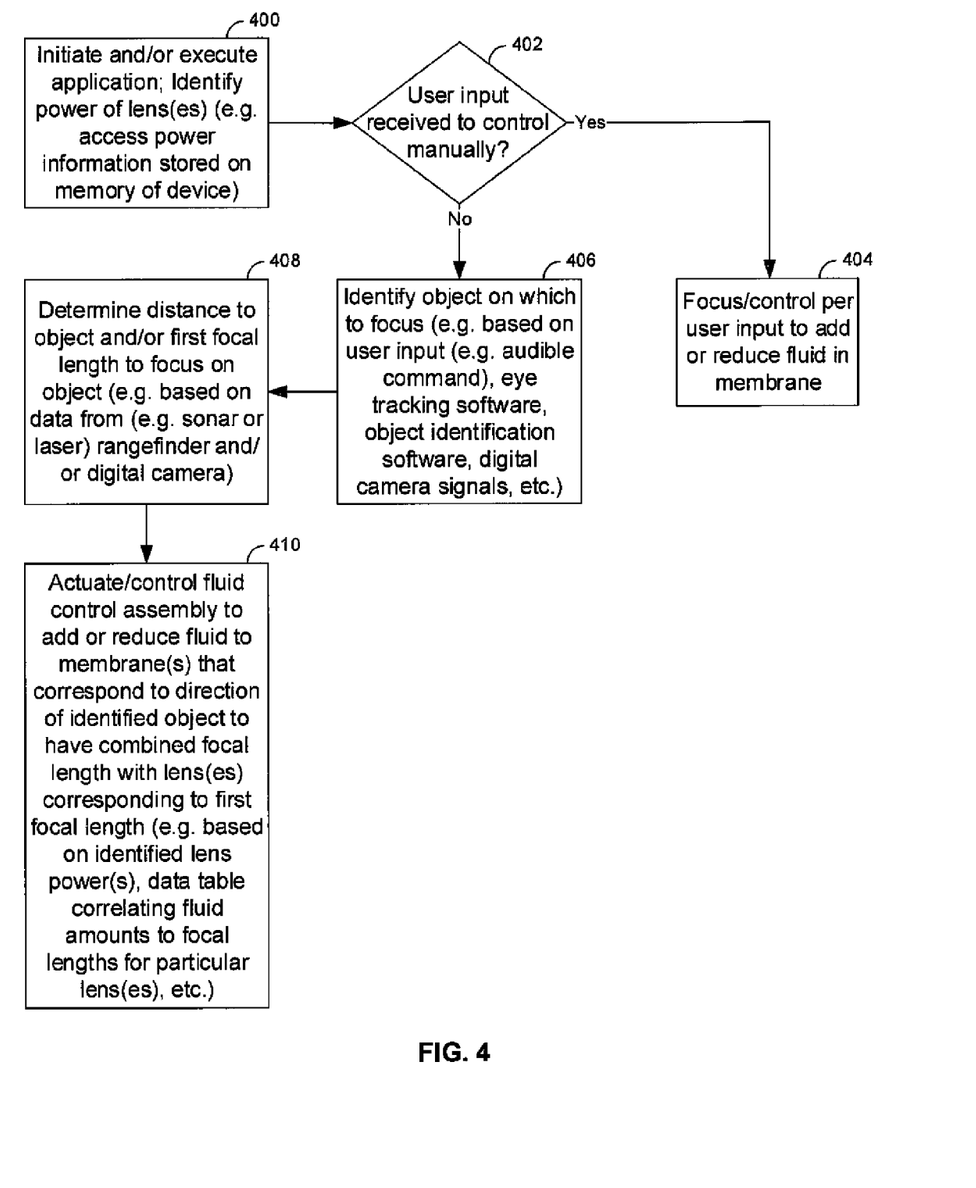
FIG. 4 is a flow chart showing an example algorithm in accordance with present principles.

Before moving on to the description of FIG. 4, it is to also be understood in reference to the glasses 300 of FIG. 3 that they may comprise a network interface for communication over at least one network such as the Internet, a WAN, a LAN, etc. under direction of the processor(s) 310 with another device such as e.g. a smart phone, and furthermore the glasses 300 may comprise e.g. a battery providing power to one or more elements of the glasses 300, where the battery is chargeable through a charge port on the glasses 300 which is in electrical communication with the battery.

Also before moving on, it is to be understood that at least one button and/or touch-enabled selector element 318 may be included on a portion of the frame 302 from which a user may control the focus of the glasses by actuating the assembly 308 to add or reduce fluid to the membrane(s) 306 based on user input. E.g., in some embodiments two buttons/selectors may be included, one which may bear a "+" sign to denote selection of it will add fluid and/or zoom in (e.g. depending on the embodiment), and one which may bear a "−" sign to denote selection of it will reduce and/or zoom out (e.g. depending on the embodiment).

Now in reference to FIG. 4, it shows example logic that may be undertaken by a device such as the system 100 and/or glasses 300 in accordance with present principles for e.g. controlling a fluid control assembly as described herein to manage fluid communication of the fluid between a reservoir and a membrane. Beginning at block 400, the logic initiates and/or executes an application for undertaking present principles. Also at block 400, the logic may identify a power of one or more lenses of the device undertaking the present logic (referred to below as the glasses). Power information for the power of the lens may be stored e.g. on a storage medium accessible to the glasses such as e.g. a storage medium actually on the glasses, and/or may be coded into the processor itself.

After block 400, the logic proceeds to decision diamond 402, at which the logic determines whether user input has been received for the user to control the focus of the lenses of the glasses based on user input (e.g. based on manipulation of the element 318 described above, and/or based on commands issued from another device such as the user's smart phone). An affirmative determination at diamond 402 causes the logic to proceed to block 404, at which the logic focuses and/or controls the focus of the glasses (e.g. by adding or reducing fluid to one or more membranes of the glasses) based on the user input.

However, a negative determination at diamond 402 instead causes the logic to proceed to block 406, at which the logic identifies an object on which to focus the lenses of the glasses (e.g. for which to configure the glasses to have a focal length corresponding to the distance to the object). The object may be identified based on e.g. object recognition principles and/or software, as well as e.g. automatic focus (e.g. "autofocus") principles and/or software. However, note that in addition to or in lieu of the foregoing, a particular object may be identified based on and/or in response to a command from a user to focus on a particular object (e.g. as received via a microphone on the glasses and processed based on audible input recognition principles and/or software). Also in addition to or in lieu of the foregoing, a particular object may be identified based at least in part on eye tracking software executing at the glasses which may be used to identify an objection, location, and/or direction at/in which the user is looking (e.g. using a camera on the glasses tracking eye movement of the user).

From block 406 the logic proceeds to block 408, where the logic determines a distance to the object identified at block 406 and/or determines a focal length (referred to below as the "first focal length") for the lenses to focus on the object based on the distance. The logic may do so at block 408 based on e.g. data from a rangefinder such as a sonar or laser distance sensor, and/or based on data from a digital camera, as disclosed herein.

In any case, after block 408, the logic proceeds to block 410 where the logic actuates and/or controls (e.g. automatically without further user input) the fluid control assembly of the glasses to add or reduce fluid to one or more membranes of the glasses (e.g. membranes that correspond to a viewing direction to the identified object e.g. relative to the normal of the lenses (e.g. as established based on the glasses being worn right side up)) to render to a combined focal length (e.g. focal length as through the lens, membrane, and fluid together) corresponding to the first focal length determined at block 408. The logic may do the foregoing at block 410 e.g. based on the lens power(s) identified at block 400, and/or by accessing a data table correlating fluid amounts for respective membranes (e.g. as measured and/or determined by the fluid control assembly) to resulting focal lengths based on the power of the respective lenses (e.g., as programmed and/or established by a manufacturer of the glasses and stored in a memory of the glasses).

Before moving on in the detailed description to other figures, it is to be understood that should the glasses include lenses of different powers e.g. based on a user's prescription where one of the user's eyes may have different vision capabilities than the other eye, the logic described above may be undertaken e.g. independently for each of the lenses to fill or reduce fluid to a membrane based on the respective power of the lens associated with the membrane. Separate reservoirs may be used to transfer fluid to and from each lens and/or membrane, and/or fluid transfer may occur to and from the same reservoir.

Furthermore, it is to be understood that the lenses may act independently of each other e.g. depending upon surrounding conditions. For example, in the case of e.g. reading glasses, if the user was looking at an object at a relatively extreme angle (e.g. to the left), the lenses may be actuated independently to have different strengths such as e.g. 1.5× for a left lens (e.g. relative to a user wearing the glasses) and 1.75× for a right lens to thus get a better view of the object.

Now in cross-reference to FIGS. 5-8, an example lens/membrane combination 500 is shown in which a membrane 502 covers a majority of a face of a lens 504, it being understood that the membrane 502 may be on an inner face and/or surface of the lens 504 or an outer face and/or surface of the lens 504 relative to the glasses being worn right side up. Thus, though not shown for clarity, it is to be understood that the membrane 502 is fluidly connected to a fluid reservoir in accordance with present principles for adding or reducing fluid in the membrane 502 and that the combination 500 is coupled to a frame of glasses. Furthermore, note that the lens 504 is shown as being planar on both faces, though it is to be understood that in some embodiments it may be e.g. biconvex, plano-convex, etc.

Figure 5:
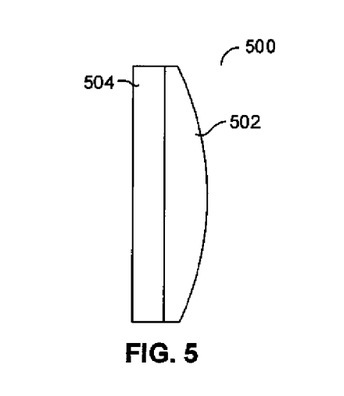
FIGS. 5-11 show example membrane and lens combinations in accordance with present principles.
Figure 6:
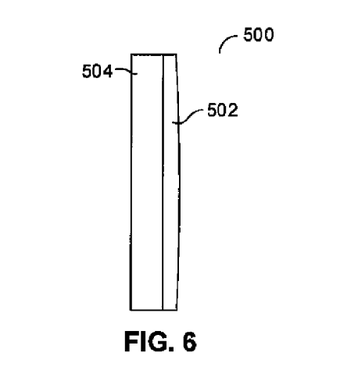
Figure 7:
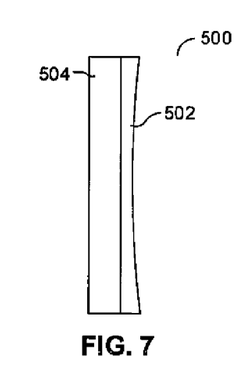
Figure 8:
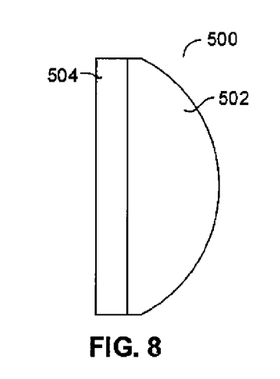

In any case, the combination 500 as shown in example FIG. 5 may be the default configuration for the combination 500. It is to be understood that a default configuration may be e.g. a configuration in which the membrane 502 is filled with a particular amount of fluid to establish an actual focal length and/or lens power corresponding to a default focal length and/or lens power (e.g. corresponding to a user's prescription for eye glasses/lenses). In reference to FIG. 6, it may be appreciated that fluid in the membrane 502 has been reduced to e.g. render a shorter focal length relative to the default configuration of FIG. 5. As may be appreciated from FIG. 7, the membrane 502 has e.g. at least partially collapsed based on an even further fluid reduction (e.g. and/or a vacuum created based on the fluid reduction) relative to the membrane 502 as shown in FIG. 6 to e.g. correspond to a focal length at which an object to be viewed is located. It may also be appreciated from FIG. 7 that the membrane 502 at least in part establishes a concave surface. As may be appreciated from FIG. 8, the membrane 502 has been filled with more fluid than it is filled with in the default configuration to thus e.g. render a greater combined focal length for the combination 500 than the default configuration shown in FIG. 5.

Figure 9:
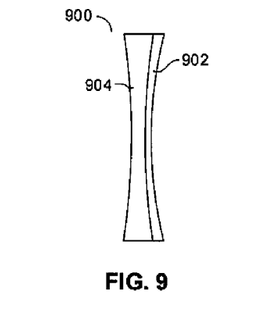
Figure 10:
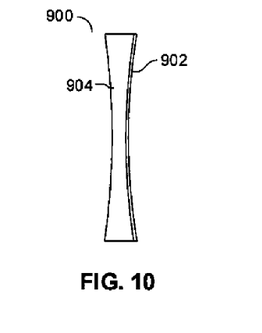
Figure 11:
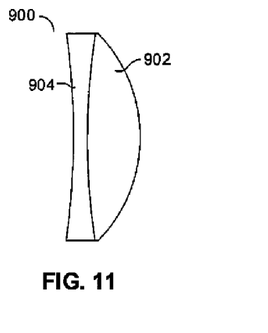

Continuing the detailed description in cross-reference to FIGS. 9-11, an example lens/membrane combination 900 is shown in which a membrane 902 covers a majority of a face of a lens 904, it being understood that the membrane 902 may be on an inner face and/or surface of the lens 904 or an outer face and/or surface of the lens 904 relative to the glasses being worn right side up. Thus, though not shown for clarity, it is to be understood that the membrane 902 is fluidly connected to a fluid reservoir in accordance with present principles for adding or reducing fluid in the membrane 902 and that the combination 900 is coupled to a frame of glasses. Furthermore, note that the lens 904 is shown as being biconcave, though it is to be understood that in some embodiments it may be e.g. plano-concave.

In any case, the combination 900 as shown in example FIG. 9 may be the default configuration for the combination 900 in accordance with present principles. As shown in FIG. 10, fluid in the membrane 902 has been reduced relative to the default configuration of FIG. 9 to render a focal length different from the default configuration. As shown in FIG. 11, fluid in the membrane 902 has been increased relative to the default configuration of FIG. 9 to render a focal length different from the default configuration.

Before moving on, it is to be understood that although the combination 900 is shown as being either concave (e.g. in FIGS. 9 and 10) or convex (e.g. in FIG. 11) at the surface bearing the membrane 902 based on the fluid amount in the membrane 902, in some embodiments the combination 900 may be configured with fluid to establish a planar surface.

Now in reference FIGS. 12-22, these figures show various front elevational views of configurations of membranes covering at least a portion respective lenses in accordance with present principles, it being understood that in each of FIGS. 12-22 the respective lens/membrane combination is understood to be coupled to glasses not shown for clarity and it being further understood that each membrane is in fluid communication with at least one fluid reservoir in accordance with present principles. Further, note that each of the configurations of the membranes described in reference to FIGS. 12-22 may have respective uses related thereto e.g. based on a direction in which an object to be focused is disposed relative to the glasses, based on the size of the object, based on user preference for which portion of a lens a user typically looks through to "focus" on something, based on other user preferences for which portion of a lens should be used to vary focal lengths and/or focus on objects using a focal length different from the focal length of the remainder of the lens, etc. Further still, note that various arrangements of membranes as described below in reference to FIGS. 12-22 may be used on a single lens face and/or may be used on the faces of different lenses that together form glasses.

Figure 12:
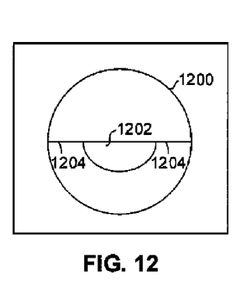
FIGS. 12-22 show various front elevational views of configurations of membranes covering at least a portion of respective lenses in accordance with present principles.

Beginning first with FIG. 12, it shows a lens 1200 with a membrane 1202 arranged on a lower portion of the lens 1200 to establish a bifocal configuration in which the portions of the lens 1200 not bearing the membrane 1202 provide a first, e.g. default focal length for the lens 1200 alone while the membrane 1202 may have fluid added or removed therefrom via e.g. one or more lumens 1204 fluidly connecting the membrane 1202 to a fluid control assembly and hence fluid reservoir to thus establish a different focal length for that area when desired in accordance with present principles.

Figure 13:
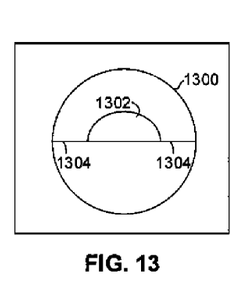

FIG. 13 shows a lens 1300 with a membrane 1302 arranged on an upper portion of the lens 1300 to establish a bifocal configuration in which the portions of the lens 1300 not bearing the membrane 1302 provide a first, e.g. default focal length for the lens 1300 alone while the membrane 1302 may have fluid added or removed therefrom via e.g. one or more lumens 1304 fluidly connecting the membrane 1302 to a fluid control assembly and hence fluid reservoir to thus establish a different focal length for that area when desired in accordance with present principles.

Figure 14:
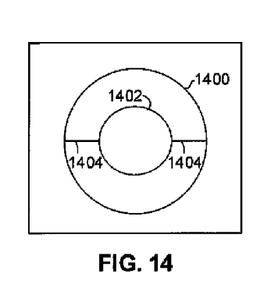

FIG. 14 shows a lens 1400 with a membrane 1402 arranged on a central portion of the lens 1400 to establish a bifocal configuration in which the portions of the lens 1400 not bearing the membrane 1402 provide a first, e.g. default focal length for the lens 1400 alone while the membrane 1402 may have fluid added or removed therefrom via e.g.

one or more lumens 1404 fluidly connecting the membrane 1402 to a fluid control assembly and hence fluid reservoir to thus establish a different focal length for that area when desired in accordance with present principles.

Figure 15:
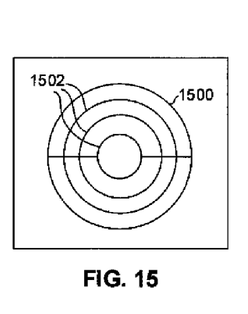

FIG. 15 shows multi-focal combination of a lens 1500 with plural membranes 1502 which may be fluidly and independently connected to a fluid reservoir via respective lumens for each of the membranes, and/or may be fluidly connected to each other and to a fluid reservoir. Note that the membranes 1502 are concentric and their respective radii may vary from relatively larger to relatively smaller to thus e.g. selectively actuate one or more of them depending on the size of an object on which the glasses are to focus.

Figure 16:
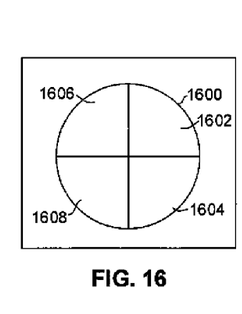
Figure 17:
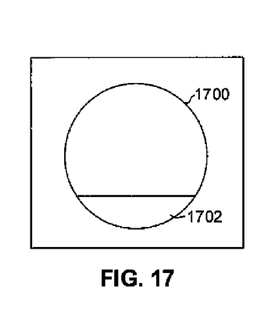
Figure 18:
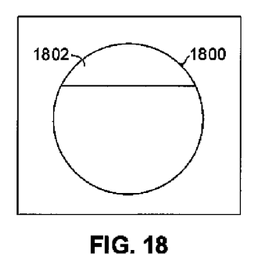

FIG. 16 shows multi-focal combination of a lens 1600 with four "quadrant" membranes 1602-1608 respectively covering an area of the lens 1600 equal to the area covered by each of the other membranes 1602-1608. FIG. 17 shows yet another bifocal configuration in which a face of a lens 1700 is covered by a membrane 1702 at a lower-most portion of the lens 1700. FIG. 18 shows a bifocal configuration in which a face of a lens 1800 is covered by a membrane 1802 on an upper-most portion of the lens 1800.

Figure 19:
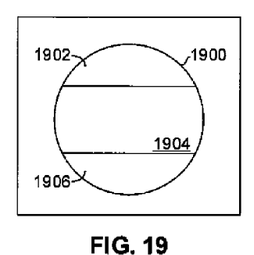
Figure 20:
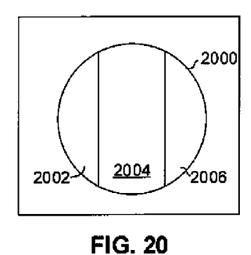
Figure 21:
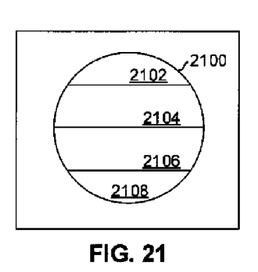
Figure 22:
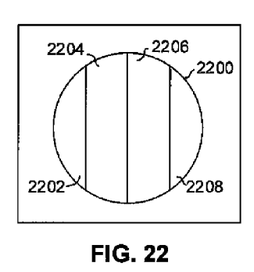

FIGS. 19-22 show various multi-focal lens/membrane configurations in which an entire front face of the respective lens is covered by plural membranes which may be independently controlled to add or reduce fluid thereto. Thus, FIG. 19 shows a lens 1900 with three membranes 1902-1906 respectively covering thirds of the lens 1900 in horizontal segments, FIG. 20 shows a lens 2000 with three membranes 2002-2006 respectively covering thirds of the lens 2000 in vertical segments, FIG. 21 shows a lens 2100 with four membranes 2102-2108 respectively covering fourths of the lens 2100 in horizontal segments, and FIG. 22 shows lens 2200 with four membranes 2202-2208 respectively covering fourths of the lens 2200 in vertical segments.

Figure 23:
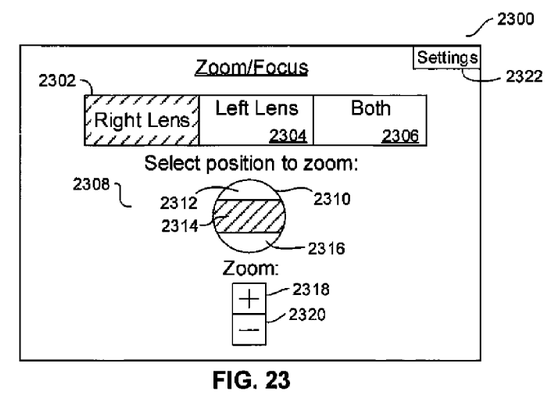
FIG. 23 shows an example user interface (UI) in accordance with present principles.

Before describing FIG. 23, it is to be understood that e.g. diagonally-arranged membranes and/or other curved membranes besides e.g. circular membranes may be used in accordance with present principles, as may e.g. other geometrically-shaped membranes such as e.g. oval membranes (e.g. for bifocal configurations), triangle-shaped membranes, crescent-shaped membranes, square-shaped membranes, rectangle-shaped membranes, trapezoidal-shaped membranes, diamond-shaped membranes, etc.

Now describing FIG. 23, it shows an example user interface (UI) 2300 presentable on a display of a device such as e.g. a display on glasses such as the glasses 300 described above and/or a display on a device such as a smart phone in communication with the glasses to control the glasses (e.g. to focus using a membrane as discussed herein). Accordingly, the UI 2300 includes a set of selector elements 2302, 2304, and 2306 respectively selectable to adjust the focus of a right lens (e.g. relative to looking through the glasses wearing them right side up), the left lens, or both lenses together (e.g. such that they both will have the same focal length at lens/membrane combination portions when adjusted). As indicated based on the shading of the element 2302, the right lens has been selected for focusing in the present example.

Furthermore, the UI 2300 includes a setting 2308 for a user to select one or more membranes of each lens to manipulate for focusing (e.g. based an addition or reduction of fluid thereto). Thus, one or more lens/membrane representations 2310 may be included on the UI 2300 showing respective representations of the membrane/lens configuration (e.g. showing which portions of the lens are covered by respective membranes) for each of the lenses selected based on selection of one of the selector elements 2302-2306. Accordingly, a representation 2310 is shown of a lens with three membranes 2312-2316 respectively covering thirds of the lens in horizontal segments. As may be appreciated from the shaded segment shown, the membrane 2314 of the right lens has been selected for focusing.

The UI 2300 also includes a focus in and/or zoom in selector element 2318 and a focus out and/or zoom out selector element 2320 respectively selectable to focus the selected membrane (in this case, the membrane 2314) by adjusting the focal length of the lens/membrane 2314 combination to a lesser length or greater length, respectively. Last, note that the UI 2300 may include a settings selector element 2322 selectable to automatically cause a settings UI to be presented on the display for configuring settings associated with the glasses. E.g., in some embodiments such a settings UI may be used to establish default membranes of respective left and right lenses which may be manipulated by a user based on user input to automatically add or reduce fluid thereto, where the user input may be directed to e.g. buttons on the glasses themselves (such as e.g. the elements 318) and/or input to elements such as the elements 2318 and 2320 presented on a UI on e.g. a smart phone, without selecting one of the elements 2302-2306 and 2312-2316 each time. E.g., such a settings UI may include selector elements similar to the elements 2302-2306 for establishing a default lens for focusing, and the settings UI may also include selector elements similar to the elements 2312-2316 for establishing a default membrane of the one or more selected lenses for focusing.

Before moving on, and although not shown in FIG. 23, it is to be understood that a UI presented in accordance with present principles (e.g. such as the UI 2300) may include an option for a user to select e.g. a different value set for adjusting the power of lenses based on the time of day and/or amount of ambient light (e.g. as sensed by a light sensor on the device), such as e.g. a setting for daytime versus nighttime adjustments (e.g., and even further, specifically for or when reading) e.g. based on user-provided lens and/or power parameters. This may be helpful to users whom are able to read with relatively powerful lenses during the day than at night (e.g. when there may be less ambient light and/or the user's eyes are tired).

Figure 24:
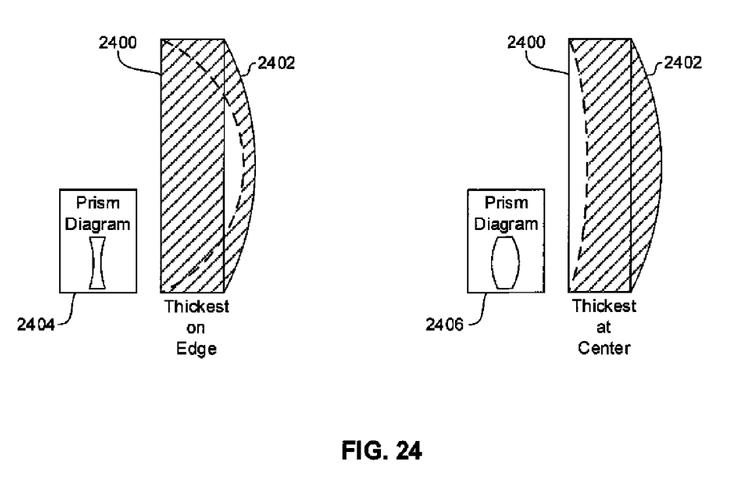
FIG. 24 shows example side elevational views of a membrane covering at least a portion of a lens.

Continuing the detailed description in reference to FIG. 24, it shows example side elevational views of a membrane 2402 covering at least a portion of a front surface of a lens 2400 on at least one lens face and even e.g. surrounding surfaces of the lens, such as e.g. lens walls between front and back faces of the lens 2400. The lens in the example shown is understood to have a lens power of positive 6.00.

The left-hand view shows the membrane 2402 in a relatively deflated configuration, while the right-hand view shows the membrane 2402 in a relatively inflated configuration. Respective prism diagrams 2404 and 2406 accompany the left-hand and right-hand views to represent prism types creating the focal effect and/or viewing effect of the lens/membrane configuration in the respective views shown. Furthermore, the left-most view may be thought of as having a thickest portion at the top and bottom edges, while the right-most view may be thought of as having a thickest portion more toward the center of the lens.

Referring specifically to the left-hand view, it shows an example where a default configuration for the lens/membrane combination is a negative two power (−2.00) and the membrane 2402 is in its most-deflated and/or default state. The lens 2400 itself (e.g. without the membrane 2402) may have a power of positive six (+6.00), while the membrane

2402 itself may have a power (e.g. generated minus curve) of negative eight (−8.00). Accordingly, the lens/membrane combination shown in the left-hand view may have a net power of negative two (−2.00). E.g., (+6.00)+(−8.00)=−2.00, resulting in a −2.00 D combination.

Now referring to the right-hand view of FIG. 24, it is to be understood that a user (or alternatively, e.g., the glasses themselves based on the logic disclosed herein) may activate the glasses to inflate the membrane 2402 from its default configuration as shown in the left-hand view to its configuration as shown in the right-hand view. In the right hand view, the lens 2400 itself (e.g. without the membrane 2402) may still have a power of positive six (+6.00), while the membrane 2402 itself may now have a power (e.g. generated minus curve) of negative four (−4.00). Accordingly, the lens/membrane combination shown in the right-hand view may have a net power of positive two (2.00). E.g., (+6.00)+(−4.00)=2.00, resulting in a 2.00 D combination.

Without reference to any particular figure, it is to be understood that in some embodiments, a membrane, compartment, fluid cell, fluid chamber, fluid sheath, etc. in accordance with present principles may cover every surface of a lens (e.g. front and back, and on all sides). Also in some embodiments, a membrane in accordance with present principles may be arranged on an inner portion of the lens itself such that it is disposed between e.g. a front face and a back face of the lens.

Still further, present principles are understood to encompass embodiments where a membrane may be arranged on sides ore walls (e.g. top and bottom sides or walls) of a flexible lens rather than a face so that e.g. as fluid is increased to the membrane, the membrane will pinch and/or bow the lens to be either convex or concave at least one face.

What's more, it is to be understood that in some embodiments there may be maximum "flexes" and/or powers for which glasses are configured to operate in conformance with, e.g. based on a user's prescription so as to only have e.g. a maximum potential range adjustment for a membrane/lens combination. This may be thought of as a "prescription max."

It may now be appreciated that present principles provide for systems and methods of adjusting the focus of a pair of glasses based on control of at least one membrane on at least one lens. For a user with normal vision (e.g. not requiring a vision prescription), the glasses may partially inflate to a neutral or zero power state as the default. Additionally, if a user is not satisfied with an automatic focus and/or adjustment range as disclosed herein, the user may "manually" adjust the range to zoom in or out to a selected distance based on button presses to e.g. the buttons 318 discussed above.

Further, present principles provide for dynamically changing the focal length in e.g. corrective lenses to tailor to a user's eyesight, such as a user with nearsightedness (myopia), farsightedness (hyperopia), presbyopia, or astigmatism by using flexible membranes.

Providing one last example, if a user's normal viewing distance and/or prescription requires a −1 power, and the distance at which the user desires to view an object requires a +1 power, a pair of glasses in accordance with present principles can focus from the default −1 power e.g. for near objects to a +1 power to focus on far objects such as the object which the user desires to view.

Before concluding, it is to be understood that although e.g. a software application for undertaking present principles may be vended with a device such as the system 100, present principles apply in instances where such an application is e.g. downloaded from a server to a device over a network such as the Internet. Furthermore, present principles apply in instances where e.g. such an application is included on a computer readable storage medium that is being vended and/or provided, where the computer readable storage medium is not a carrier wave and/or a signal per se.

While the particular GLASSES WITH FLUID-FILLABLE MEMBRANE FOR ADJUSTING FOCAL LENGTH OF ONE OR MORE LENSES OF THE GLASSES is herein shown and described in detail, it is to be understood that the subject matter which is encompassed by the present application is limited only by the claims.

What is claimed is:

1. Eye glasses, comprising:
 a frame;
 at least one lens coupled to the frame;
 at least one membrane at least partially covering at least one face of the lens, wherein the membrane covers less than half the area of the face at a lower half of the lens relative to the eye glasses being worn right side up;
 a reservoir in fluid communication with the membrane and containing fluid;
 a fluid control assembly which controls fluid communication of the fluid between the reservoir and the membrane;
 a processor; and
 storage accessible to the processor and bearing instructions executable by the processor to:
 identify an object on which to focus;
 determine a first focal length at which to focus on the object; and
 actuate the fluid control assembly to provide fluid to the membrane to configure the portion of the lens bearing the membrane to have a combined focal length corresponding to the first focal length.

2. The eye glasses of claim 1, wherein the fluid control assembly comprises a pump to transfer fluid between the reservoir and the membrane.

3. The eye glasses of claim 2, wherein the fluid control assembly comprises a valve actuatable to block fluid flow between the reservoir and the membrane.

4. The eye glasses of claim 1, wherein the membrane has at least substantially the same index of refraction as the lens.

5. The eye glasses of claim 4, wherein the fluid has at least substantially the same index of refraction as the lens and membrane.

6. The eye glasses of claim 1, wherein the face establishes a surface at least substantially orthogonal to the principal axis of the lens.

7. The eye glasses of claim 1, wherein the face is convex.

8. The eye glasses of claim 1, wherein the instructions are executable to:
 access lens power information pertaining to the power of the lens; and
 actuate, based at least in part on the lens power information, the fluid control assembly to provide fluid to the membrane to configure the portion of the lens bearing the membrane to have the combined focal length.

9. The eye glasses of claim 1, comprising a camera in communication with the processor, wherein the instructions are executable to actuate the camera to determine the first focal length.

10. The eye glasses of claim 1, comprising a distance sensor in communication with the processor, wherein the instructions are executable to actuate the distance sensor to determine the first focal length, and wherein the distance sensor determines a distance from the eye glasses to the object at least in part using at least one of the group consisting of: lasers, sonar.

11. The eye glasses of claim 1, comprising:
an element in communication with the fluid control assembly and manipulable by a user to control, using the fluid control assembly, fluid communication of the fluid between the reservoir and the membrane.

12. The eye glasses of claim 1, wherein the instructions are executable by the processor to actuate the fluid control assembly to provide fluid to the membrane based on one or more of: time of day, ambient light, an activity being engaged in by a user.

13. A method, comprising:
determining a distance from a device to an object, wherein the device comprises at least one lens, at least one membrane at least partially covering at least one face of the lens at a first area, and a reservoir in fluid communication with the membrane; and
controlling the at least one membrane to at least partially fill with fluid from the reservoir to configure the first area to have a focal length corresponding to the distance;
wherein the membrane covers no more than half the area of the face at a lower half of the lens relative to the device being worn right side up.

14. The method of claim 13, comprising:
using a distance sensor on the device to determine the distance.

15. The method of claim 13, wherein the membrane is controlled to fill with fluid to configure the first area to have the focal length based at least in part on a power associated with the lens.

16. The method of claim 13, wherein the device comprises at least two lenses comprising a first lens and a second lens, and wherein the device comprises at least two membranes comprising a first membrane and a second membrane, the first membrane covering no more than half the area of the face of the first lens at a lower half of the first lens relative to the device being worn right side up, the second membrane covering no more than half the area of the face of the second lens at a lower half of the second lens relative to the device being worn right side up, the reservoir being in fluid communication with the first and second membranes, the method comprising:
independently controlling each of the at least first and second membranes to at least partially fill with fluid from the reservoir to configure the first area and the second area to both have focal lengths corresponding to the distance.

17. The method of claim 13, comprising:
controlling the at least one membrane to at least partially fill with fluid from the reservoir based on one or more of: time of day, an activity being engaged in by a user.

18. A device, comprising:
a frame;
at least one lens coupled to the frame;
at least one compartment at least partially covering at least one face of the lens, wherein the compartment covers no more than half the area of the face at a lower half of the lens relative to the device being worn right side up;
a reservoir in fluid communication with the compartment and containing fluid;
a processor; and
storage accessible to the processor and bearing instructions executable by the processor to:
control the device to manage fluid transfer between the reservoir and the compartment based on at least one of: input from a person, a determination using the processor that pertains to fluid transfer.

19. The device of claim 18, wherein the instructions are executable by the processor to:
control the device to manage fluid transfer between the reservoir and the compartment based on an activity being engaged in by a user.

20. The device of claim 18, wherein the determination at least in part using the processor is a determination of distance to an object.

* * * * *